US008255435B2

(12) United States Patent
Lake

(10) Patent No.: US 8,255,435 B2
(45) Date of Patent: Aug. 28, 2012

(54) DETECTING MEMORY MANAGEMENT ANTI-PATTERNS

(75) Inventor: John M. Lake, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1327 days.

(21) Appl. No.: 10/960,184

(22) Filed: Oct. 7, 2004

(65) Prior Publication Data

US 2006/0080364 A1     Apr. 13, 2006

(51) Int. Cl.
*G06F 12/00* (2006.01)
*G06F 17/30* (2006.01)

(52) U.S. Cl. ..................................... 707/813

(58) Field of Classification Search .................. None
See application file for complete search history.

(56) References Cited

U.S. PATENT DOCUMENTS

| | | | | |
|---|---|---|---|---|
| 5,590,329 | A * | 12/1996 | Goodnow et al. | 717/144 |
| 6,425,063 | B1 | 7/2002 | Mattson et al. | |
| 6,430,564 | B1 | 8/2002 | Judge et al. | |
| 6,473,773 | B1 | 10/2002 | Cheng et al. | |
| 6,851,105 | B1 * | 2/2005 | Coad et al. | 717/106 |
| 2004/0181562 | A1 * | 9/2004 | Findeisen | 707/206 |

OTHER PUBLICATIONS

Hallal et al., Antipattern-based Detection of Deficiencies in Java Multithreaded Software,Sep. 2004,IEEE, Proceedings of the 4th International Conference on Quality Software, 10 pages.*
Smith et al., Software Performance Antipatterns,Sep. 2000, Proceedings 2nd International Workshop on Software and Performance, 11 pages.*
Moha et al., On the Automatic Detection and Correction of Software Architectural Defects in Object-Oriented Designs, University of Montreal,7 pages.*
Kappos, David, Subject Matter Eligibility of Computer Readable Media, Jan. 2010, USPTO, 1 page.*
Lynch et al., INSPEC, AN 7678140, "RAMBO: A Reconfigurable Atomic Memory Service for Dynamic Networks", 2002.
Broughton, INSPEC, AN 1835460, "Data Management for Large Memory Device Characterization", 1981.
Myers, INSPEC, AN 4492144, "Memory Management in C++; Fine-Tuning your Programs", 1993.
IBM Technical Disclosure Bulletin, "Run Time Memory Management Algorithm/Supervisor and WatchDog Support Program", vol. 39, No. 04, pp. 265-268, Apr. 1996.
IBM Technical Disclosure Bulletin, "Program Restructuring Technique for Improving Memory Management Performance", vol. 39, No. 3, pp. 203-205, Mar. 1996.
Demsky et al., "Automatic Detection and Repair of Errors in Data Structures", pp. 78-95, 2003.
Lloyd et al., "Legacy Information Systems and Business Process Change: A Patterns Perspective", Communications of the Association for Information Systems, vol. 2, Article 24, Dec. 1999.

* cited by examiner

*Primary Examiner* — Jared Rutz
*Assistant Examiner* — Gary W Cygiel
(74) *Attorney, Agent, or Firm* — Cuenot, Forsythe & Kim, LLC

(57) ABSTRACT

The present invention provides a method, system, and computer program product for detecting memory management anti-patterns. The method comprises: periodically generating census data for at least one object type in a heap; collecting the periodically generated census data for each object type into a time series; analyzing each time series; and classifying each time series into one of a plurality of different categories based on the analysis.

19 Claims, 6 Drawing Sheets

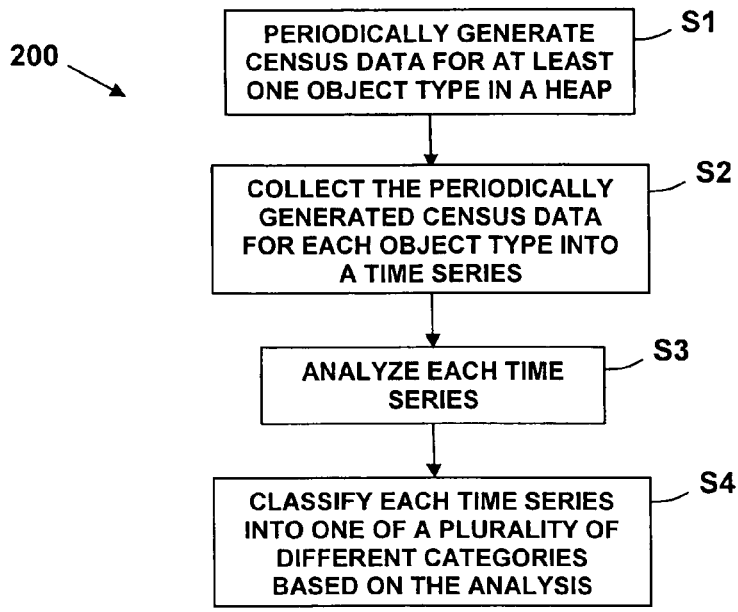

Example output from HeapRoots analysis:

Tabulating all objects, sorted by total-size

| Count | Total-size | Type Name |
|---|---|---|
| 261,025 | 18,301,672 | array of java/util/HashMap$Entry |
| 260,966 | 16,701,824 | jml/leakDetective/TimeOfLastUse$MethodMap |
| 286,267 | 9,160,544 | java/util/WeakHashMap$WeakKey |
| 263,766 | 8,440,512 | java/util/HashMap$Entry |
| 260,966 | 8,350,912 | jml/leakDetective/TimeOfLastUse$TimeOfLastUseLeaf |
| 260,966 | 6,263,184 | jml/leakDetective/TimeOfLastUse |
| 26,297 | 631,128 | jml/leakDetective/test/Loiterer |
| 1,666 | 534,328 | primitive array |
| 26,938 | 431,008 | jml/leakDetective/test/SimpleObject |
| 25,298 | 404,768 | jml/leakDetective/test/NonLoiterer |
| 1,752 | 56,064 | java/lang/String |
| 729 | 23,328 | java/util/Hashtable$Entry |

DETECTING MEMORY MANAGEMENT ANTI-PATTERNS

BACKGROUND OF THE INVENTION

1. Field of the Invention

The present invention generally relates to memory management. More particularly, the present invention provides a method, system, and computer program product for detecting performance-degrading memory management anti-patterns, particularly in systems with automatic storage reclamation ("garbage collection").

2. Related Art

A pattern is a common solution to a problem that occurs in many different contexts. Patterns capture expert knowledge about "best practices" in software design in a form that allows that knowledge to be reused and applied in the design of many different types of software. Anti-patterns are conceptually similar to patterns in that they document recurring solutions to common design problems. They are known as anti-patterns because their use (or misuse) produces negative consequences. Anti-patterns document common mistakes made during software development as well as their solutions. Anti-patterns address software architecture and design as well as the software development process itself.

When an object is created in an object-oriented software environment such as Java, the memory to contain the object (and any objects that it contains) must be allocated from the heap and any initialization code for the object and the contained objects must be executed. When the object is no longer needed, necessary clean-up must be performed and the reclaimed memory must be returned to the heap to avoid "memory leaks." While the overhead for creating and destroying a single object may be small, when a large number of short-lived objects are frequently created and then destroyed (also referred to as "object churn") the performance impact may be significant, and memory leaks resulting in out-of-control memory growth may occur. This type of excessive dynamic allocation anti-pattern, therefore, should be detected and refactored (restructured or reorganized) to overcome its negative consequences.

Known solutions for detecting performance-degrading memory management anti-patterns generally comprise weak, informal methods that rely on the skill and insight of one or more highly skilled analysts poring through the output of a memory debugging tool or raw heap dumps looking for unexpectedly retained objects. A common strategy involves running a system for a period of time, performing garbage collection, taking a baseline snapshot of the heap (H1), and running a test case to completion. After completion of the test case, garbage collection is again performed and a second snapshot of the heap (H2) is taken. Objects present in the second snapshot of the heap (H2) that are not present in the first snapshot of the heap (H1) are candidate "memory leaks," i.e., objects possibly retained that the garbage collection system cannot prove are reclaimable but that nonetheless will not contribute to the future of the computation. This process is illustrated in the graph 100 of FIG. 1, in which a candidate memory leak has been detected using the H2-H1 snapshot comparison method described above.

Procedures based on this strategy can only detect long-lived unnecessary object retention. Another class of memory management problems (uncontrolled heap growth) arises from short-lived object retention due, for example, to object churn and other transient memory requirements that increase process size (footprint) and related processing costs. As illustrated in the graph 100 of FIG. 1, the H2-H1 snapshot comparison method will show no net growth in the size of the heap in such cases (no new objects in the second snapshot relative to the first) and therefore will not detect this problem. It should be noted that a heapdump is not a complete dump of all the objects. Some objects are held in a thread-local cache temporarily. This and asynchronous garbage collection contribute to the noise level for determining whether an out-of-control memory growth situation is at hand and make the need for a new solution apparent.

Accordingly, a new solution is required to: (1) address the increasingly rare skill set that is required to analyze program behaviors to detect and repair memory management anti-patterns; (2) minimize the time required to detect memory management issues, analyze their root cause, and eliminate them in software development environments; and (3) provide for the deployment of analytic tools in production environments to enable fast, automatic identification of the root cause of memory growth.

SUMMARY OF THE INVENTION

In general, the present invention provides a method, system, and computer program product for detecting performance-degrading memory management anti-patterns, particularly in systems with automatic storage reclamation ("garbage collection"). In particular, in accordance with the present invention, census data is periodically collected to obtain the distribution of live object types. The collected census data is then subjected to time-series analysis, and each time series is classified into one of a plurality of different categories that reflect different kinds of memory management issues over a variety of temporal scales. These classifications are used to drive the collection of additional information to pinpoint the contributors to the memory management issue.

A first aspect of the present invention is directed to a method for detecting memory management anti-patterns, comprising: periodically generating census data for at least one object type in a heap; collecting the periodically generated census data for each object type into a time series; analyzing each time series; and classifying each time series into one of a plurality of different categories based on the analysis.

A second aspect of the present invention is directed to a system for detecting memory management anti-patterns, comprising: a system for periodically generating census data for at least one object type in a heap; a system for collecting the periodically generated census data for each object type into a time series; a system for analyzing each time series; and a system for classifying each time series into one of a plurality of different categories based on the analysis.

A third aspect of the present invention is directed to a program product stored on a recordable medium for detecting memory management anti-patterns, which when executed comprises: program code for periodically generating census data for at least one object type in a heap; program code for collecting the periodically generated census data for each object type into a time series; program code for analyzing each time series; and program code for classifying each time series into one of a plurality of different categories based on the analysis.

A fourth aspect of the present invention is directed to a method for deploying an application for detecting memory management anti-patterns, comprising: providing a computer infrastructure being operable to: periodically generate census data for at least one object type in a heap; collect the periodically generated census data for each object type into a time series; analyze each time series; and classify each time series into one of a plurality of different categories based on the analysis.

A fifth aspect of the present invention is directed to computer software embodied in a propagated signal for detecting memory management anti-patterns, the computer software comprising instructions to cause a computer system to perform the following functions: periodically generate census data for at least one object type in a heap; collect the periodically generated census data for each object type into a time series; analyze each time series; and classify each time series into one of a plurality of different categories based on the analysis.

BRIEF DESCRIPTION OF THE DRAWINGS

These and other features of this invention will be more readily understood from the following detailed description of the various aspects of the invention taken in conjunction with the accompanying drawings in which:

FIG. 2 depicts a flow diagram of a method in accordance with an embodiment of the present invention.

FIG. 3 depicts a census of object types in a heap.

Figure 1:
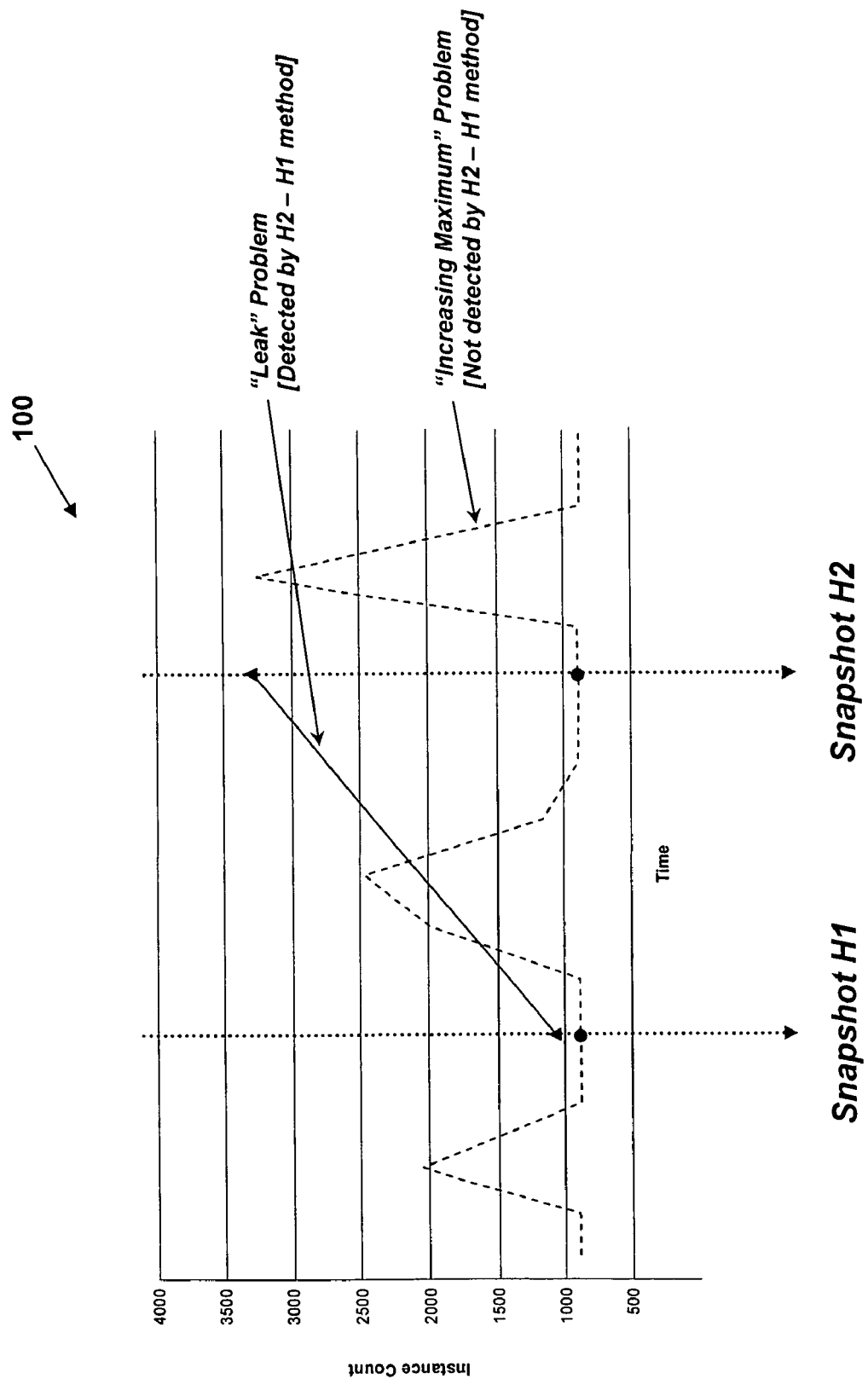
FIG. 1 depicts a method for detecting memory leaks in accordance with the prior art.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and computer program product for detecting performance-degrading memory management anti-patterns, particularly in systems with automatic storage reclamation ("garbage collection"). In particular, in accordance with the present invention, census data is periodically collected to obtain the distribution of live object types. The collected census data is then subjected to time-series analysis, and each time series is classified into one of a plurality of different categories that reflect different kinds of memory management issues over a variety of temporal scales. These classifications are used to drive the collection of additional information to pinpoint the contributors to the memory management issue.

A flow diagram 200 of a method in accordance with the present invention is illustrated in FIG. 2. Given a workload comprising a series of periodic task executions (iterations), the following steps are performed: (step S1) periodically generate census data for at least one object type in a heap; (step S2) collect the periodically generated census data for each object type into a time series; (step S3) analyze each time series; and (step S4) classify each time series into one of a plurality of different categories that reflect different kinds of memory management issues, based on the analysis.

In order to obtain the census data, the invention generates a series of heapdumps, each preceded by a garbage collection. For example, for International Business Machine's (IBM's) Java Virtual Machine (JVM), a series of heapdumps can be generated as follows:

(a) set the environment variable IBM_HEAPDUMP=true;
(b) set the environment variable IBM_HEAPDUMPDIR=<the directory you want this run's heapdumps to go into>; and
(c) call com.ibmjvm.Dump.HeapDump( ) periodically. This can be done using an internal method, for example, by creating a daemon thread that runs while (true) { . . . sleep(delay); . . . HeapDump( );}, or using an external method, for example, by sending a signal appropriate to the platform (SIGQUIT on Linux/AIX; SIGINT on Windows).

It should be noted that many other techniques can be used to generate the necessary series of heapdumps, and that the specific example provided above is not intended to be limiting.

For each heapdump in the series, a census of the object types in the generated heap is obtained. For example, a census of object types in each generated heap can be provided using runtime probes or a debugging tool such as HeapRoots, available from IBM. Other techniques, such as instrumenting class constructors and finalizers with probes (e.g., in accordance with Aspect Oriented Programming), dynamic bytecode rewriting, or the use of the JVM Tool Interface (JVMTI) heap functions can also be used.

When using HeapRoots, the following command can be used to obtain a census of object types in a generated heap: echo "t-"|java-jar HeapRoots205/HR205.jar heapdump.20040420.204732.3664.txt This HeapRoots command will create an output 300 such as that shown in FIG. 3.

The census data for each object is collected into a time series, and the characteristics of the time series are analyzed. Based on this analysis, each time series is classified into one of a plurality of different categories that reflect different kinds of memory management issues. In accordance with an embodiment of the present invention, the following categories are used: constant time series, capped time series, increasing maximum time series, and bounded time series. Many other categories are also possible.

Figure 4:
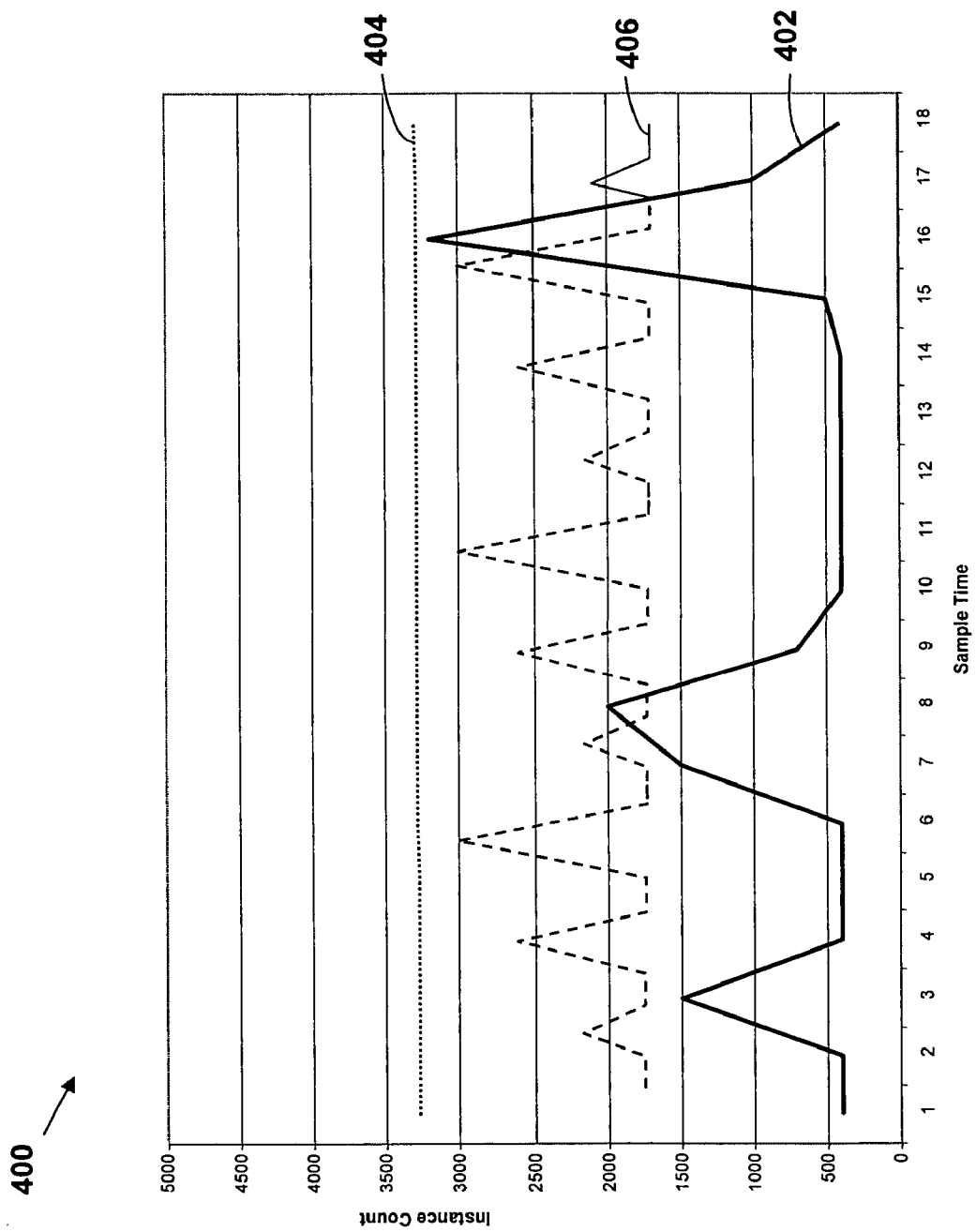
FIG. 4 depicts an illustrative graph of a census data time series generated in accordance with the present invention.

A constant time series (e.g., n, n, n, n, n, . . . ) for an object does not pose a memory problem because the census data for that object does not increase over time. A maximum capped time series (e.g., n, 2n, Xn, n/2, n, Xn, . . . (with a long-term maximum of Xn)) and a bounded time series (e.g., a capped minimum and capped maximum time series) however, may contribute to a memory problem. For example, maximum capped and bounded time series may contribute to a memory problem by alignment, causing overall heap growth even though the number of objects of each type are bounded. The same mathematical phenomenon gives us "monster waves." Imagine two threads running at different periods, one running every minute and the other running every 10 seconds. The 11 second thread is a maximum capped series comprised of 200 total objects max, the 60 second thread is a maximum capped series comprised of 200 total objects. Most of the time, there are only 200 objects around. At 60*11 seconds, 400 objects are simultaneously live. Add in the non-determinism typical of such programs and their garbage collectors, and it can easily look like a heap that grows a little bit every so often whereas none of the object census time series show growth. An increasing maximum time series (e.g., 1, 100, 150, 78, 100, 150, 175, 200, 140, 130, 70, 0, 0, 0, 300), on the other hand, is a clear contributor to a memory problem because it indicates that an out-of-control memory growth situation is occurring. Examples of an increasing maximum time series 402, a constant time series 404, and a maximum capped time series 406 are illustrated in the graph 400 of FIG. 4.

An increasing maximum time series is a signature of a memory leak associated with object churn and/or which is exercising a particular weakness in the garbage collection technique being used. It indicates that some program component is using an excessive amount of memory comprised of very short lived objects.

For the object types involved in each increasing maximum time series, additional information is desirable to pinpoint the offending code (for example, when creating a problem ticket). The additional information may include, for example, the static (code line) and dynamic (stack context) location of allocations; whether the object is contained in a cache (heap root); and whether the object is subject to finalization. Some additional biographical data may be of interest as well, specifically duration of maturation, active, retirement and finalization periods. Other types of information may also be generated to pinpoint offending code.

A illustrative program demonstrating typical memory management issues is presented below:

```
public class PeriodicSpike {
    public static Object[ ] spike;
    public static class LeakingObject { }
    public static void generateSpike( int k ) {
        spike = new Object[ 100 * k ];
        for (int i = 0; i < 100*k; ++i) {
            spike[i] = new LeakingObject( );
        } }
    public static void freeSpike( ) {
        spike = null;
    }
    public static void main(String[ ] args) {
        for (int i = 0; i < 10; ++i) {
            generateSpike( i );
            com.ibm.jvm.Dump.HeapDump( );
            freeSpike( );
            try { Thread.sleep( 1500 ); }
            catch (InterruptedException ie) { }
            if (args.length > 0) System.gc( );
        } } }
```

This program creates ten "spikes" comprised of 100, 200, 300, 400, 500, 600, 700, 800, 900, and 1000 instances of LeakingObject held in a cache (the array "spike"), with a heap dump generated between spikes. One run of this program generates a time series such as:

PeriodicSpike$LeakingObject: 0, 0, 107, 204, 179, 154, 513, 488, 705, 664 This time series is an increasing maximum time series: 0, 0, 107, 204, 204, 204, 513, 513, 705, 705. A pattern like this of sufficient length is certainly indicative of potentially unbounded resource consumption. Notice that the counts in the heap are not 100, 200, . . . , 1000. This indicates that some of the objects created on each iteration are in the thread local memory cache and have not yet migrated into the heap. This is one of the characteristics of high-performance implementations of garbage collected languages that makes heap analysis and memory resource consumption difficult using prior art techniques.

Another time series in the data for the reference may look like:

java/lang/ref/Finalizer: 448, 448, 448, 416, 416, 416, 416, 416, 416, 416

This time series is a capped time series with no growth over the period of observation. It may be a contributor to a resource consumption problem (as it serves as a root for reaching other objects), but by itself it does not represent a resource consumption problem.

The present invention provides a comprehensive algorithm for memory-related problem debugging. The algorithm includes: monitor/detect; and analyze/isolate to enable plan and cure. Basic detection includes detecting whether memory use is increasing. Advanced detection includes detecting whether subsystem memory usage is increasing. Isolation includes reporting of detected possible problems with severity. Examples of isolation may include: basic isolation (implicated object types), moderate isolation (implicated object types and data structures), and advanced isolation (implicated object types, data structures and lifetimes).

Figure 5:
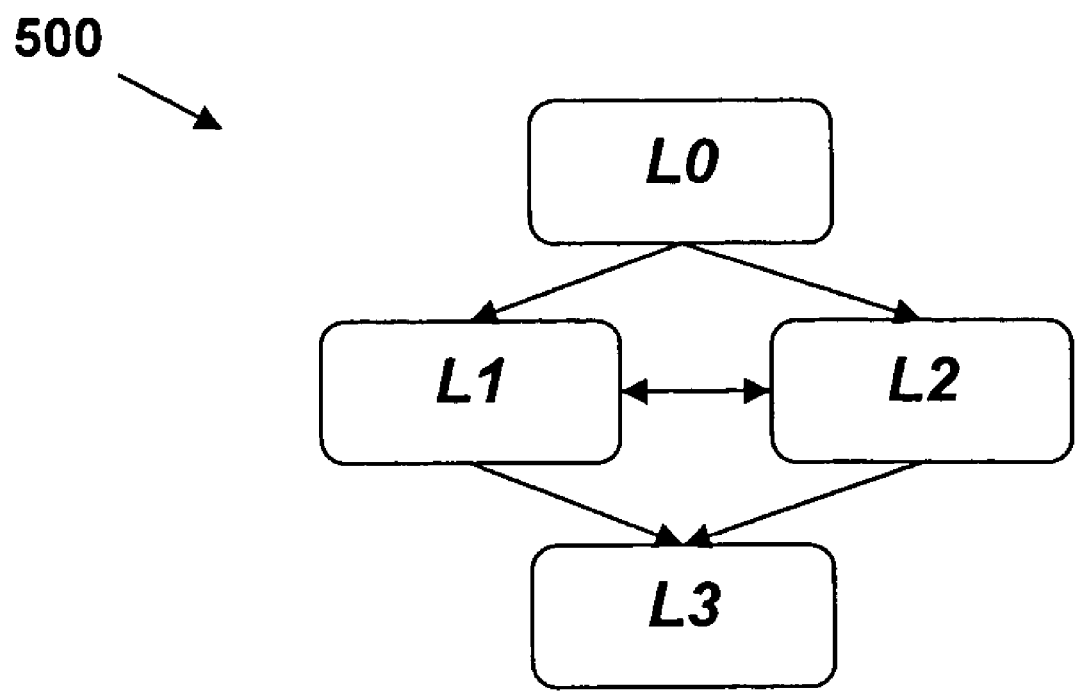
FIG. 5 depicts a memory management issue detection strategy in accordance with an embodiment of the present invention.

An illustrative detection strategy 500 is illustrated in FIG. 5. In general, the strategy 500 comprises: using coarse- to fine-grained detection and classification; and using classification to drive isolation strategy. As shown, the strategy comprises components L0 to L3. L0 includes global growth rate and balance monitoring (i.e., might there be a problem?). L0 can be based, for example, on (max) heap size, process size, total objects allocated/reclaimed, classloads, etc. L1 includes type-based detection (i.e., class or category). L1 can be based, for example, on (max) live objects per type/size, objects allocated, objects reclaimed, etc. This may include examining the change in distribution of object types. L2 uses L0 and L1 to drive snapshots at points of interest for analysis (e.g., for offline analysis). The heap can be externalized for reference graph and/or distributional (L1) analyses. L3 includes context-based problem isolation based on L1, L2 indicators, and may include monitoring and classification by allocation site/context, object lifetime, etc.

Another method for detecting memory management problems comprises the tracking of expected (or net) change statistics. The following metrics can be used:

E[change]: overall trending
E[change|change !=0]: trending when changing
E[-decrease|GC]: trending at full garbage collection In general, large and/or positive E[x] indicate possible problems.

Figure 6:
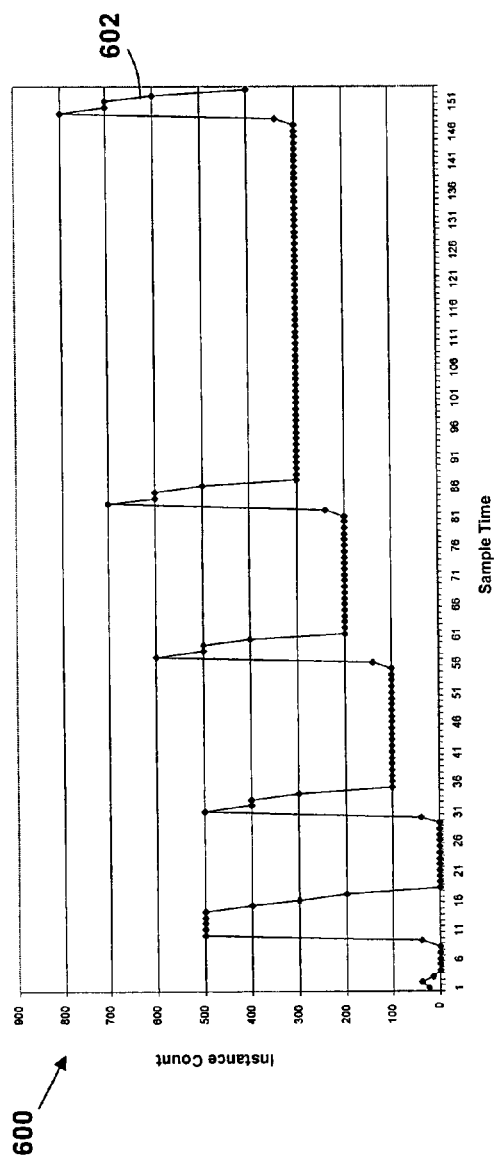
FIG. 6 depicts another graph of a census data time series generated in accordance with the present invention.
Figure 7:
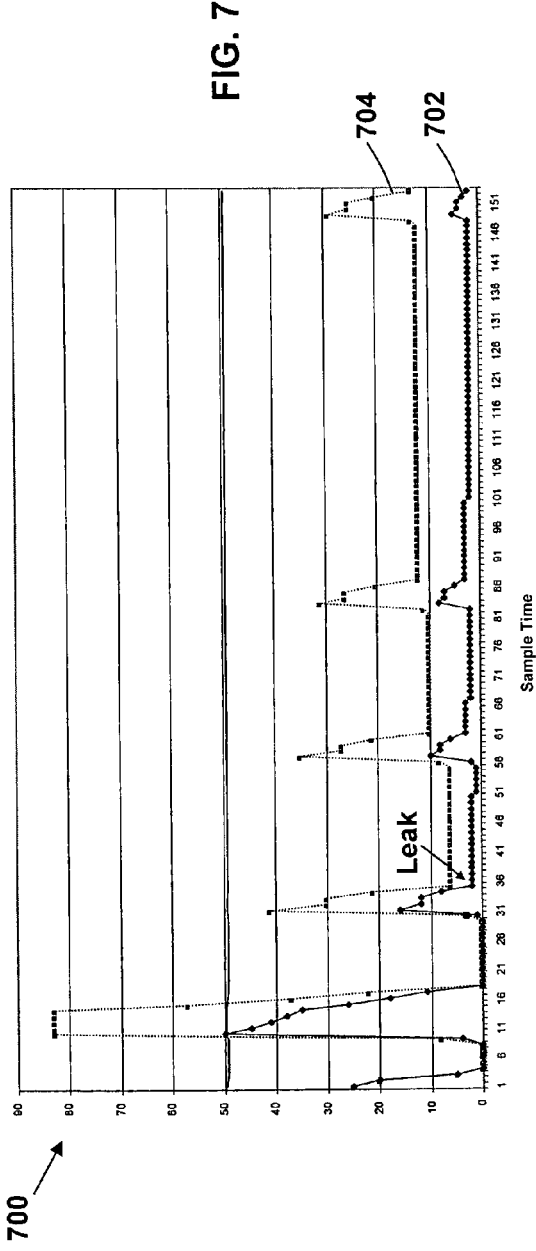
FIG. 7 depicts a graph of expected (or net) change statistics for the census data time series illustrated in FIG. 6.

The above detection process is illustrated with reference to FIGS. 6 and 7. In FIG. 6, for example, there is depicted an illustrative graph 600 of the number of live objects over time, wherein graph 600 is generated as detailed above. Graph 600 illustrates an increasing maximum time series 602. In FIG. 7, there is depicted an illustrative graph 700 of the metrics E[change] (702) and E[change|change !=0] (704) for the maximum time series 602. E[change] approaches 0 as the number of intervals without activity increases. A memory leak is present when E[change|change!=0]>0. To this extent, in FIG. 7, a leak appears around t=35.

A sample driver thread and parameters for implementing this process may comprise:

```
while (true) {
    sleep( intervalSeconds );
    intervalTick( );
    if (doAdvisoryGC && (--intervalsUntilAdvGC) < 1) {
        preAdvisoryGC( );
        System.gc( );
        postAdvisoryGC( );
        intervalsUntilAdvGC = intervalsPerAdvisoryGC;
    }
    <intervalsUntilReport>( emitReport( ) );
    <intervalsUntilBaseline>( resetBaseline( ) );
}
```

If the expected change in simultaneously live objects is greater than 0 for class C, then there may be a possible memory leak involving class C. This detects slow memory leaks that result from retention of small percentage of objects. If the expected change in the maximum number of instances is greater than 0 for class C and if the expected change in simultaneous live objects is greater than 0, then there may be a persistent memory leak. This detects memory leaks and spikes. If the expected change due to advisoryGC is considerably less than 0 for class C, then heap size and other garbage collection strategy tuning recommendations are possible.

Figure 8:
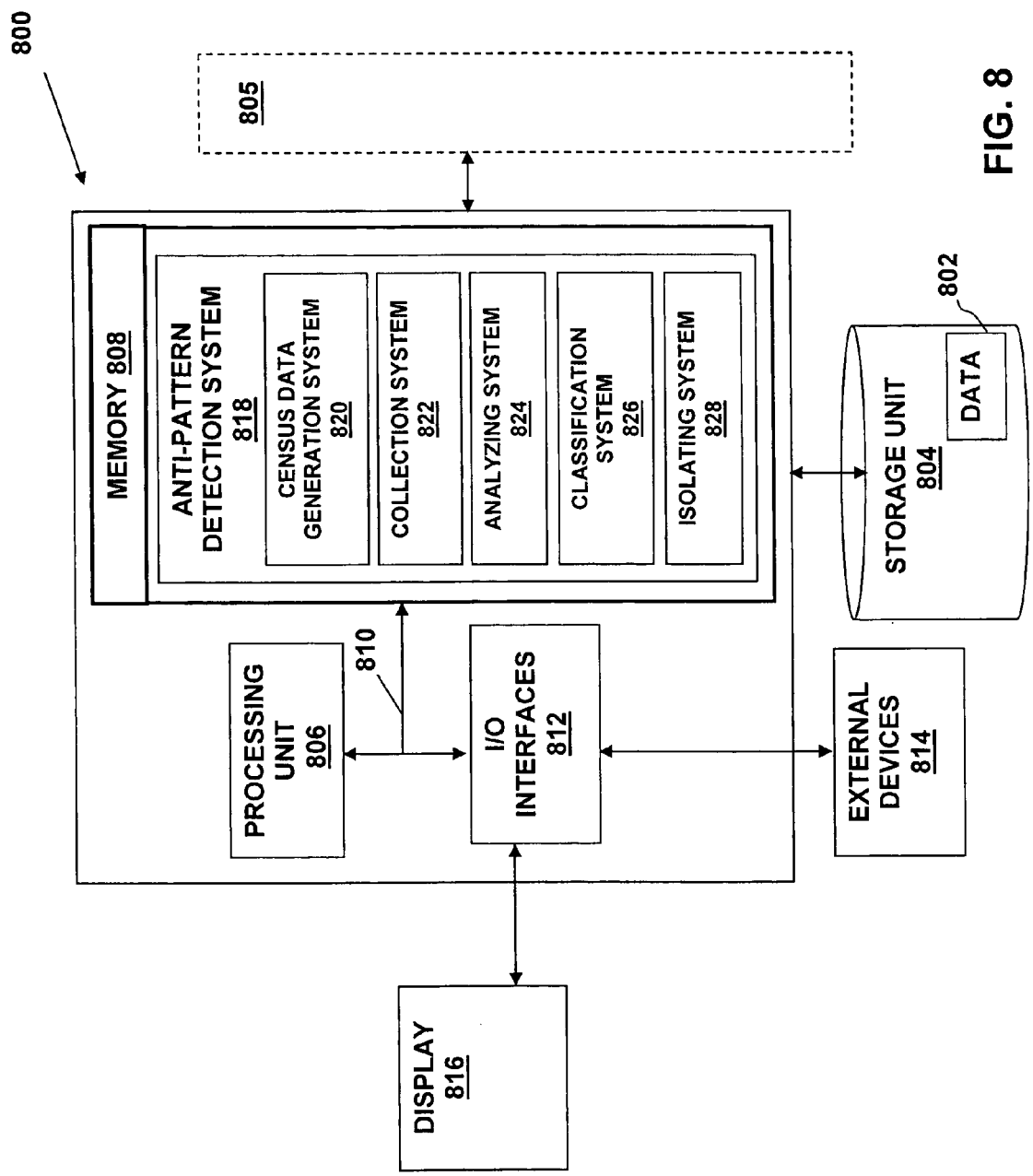
FIG. 8 depicts a computer system for implementing the present invention.

Referring now to FIG. 8, there is illustrated a computer system 800 for detecting memory management anti-patterns in accordance with the present invention. Computer system 800 is intended to represent any type of computerized system capable of implementing the methods of the present invention. For example, computer system 800 may comprise a desktop computer, laptop computer, workstation, server, hand-held device, pager, etc.

Data 802 (e.g., census data, time series data, etc.) used in the practice of the present invention can be stored locally to computer system 800, for example, in storage unit 804, and/or may be provided to computer system 800 over a network 805. Storage unit 804 can be any system capable of providing storage for data and information under the present invention. As such, storage unit 804 may reside at a single physical location, comprising one or more types of data storage, or may be distributed across a plurality of physical systems in various forms. In another embodiment, storage unit 804 may be distributed across, for example, a local area network (LAN), wide area network (WAN) or a storage area network (SAN) (not shown). Network 805 is intended to represent any type of network over which data can be transmitted. For example, network 805 can include the Internet, a wide area network (WAN), a local area network (LAN), a virtual private network (VPN), a WiFi network, a personal area network (PAN), or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

As shown, computer system 800 generally includes a processing unit 806, memory 808, bus 810, input/output (I/O) interfaces 812 and external devices/resources 814. Processing unit 806 may comprise a single processing unit, or may be distributed across one or more processing units in one or more locations, e.g., on a client and server. Memory 808 may comprise any known type of data storage and/or transmission media, including magnetic media, optical media, random access memory (RAM), read-only memory (ROM), etc. Moreover, similar to processing unit 806, memory 808 may reside at a single physical location, comprising one or more types of data storage, or be distributed across a plurality of physical systems in various forms.

I/O interfaces 812 may comprise any system for exchanging information to/from an external source. External devices/resources 814 may comprise any known type of external device, including speakers, a CRT, LED screen, handheld device, keyboard, mouse, voice recognition system, speech output system, printer, monitor/display (e.g., display 816), facsimile, pager, etc.

Bus 810 provides a communication link between each of the components in computer system 800, and likewise may comprise any known type of transmission link, including electrical, optical, wireless, etc. In addition, although not shown, other components, such as cache memory, communication systems, system software, etc., may be incorporated into computer system 800.

Shown in memory 808 is an anti-pattern detection system 818 which may be provided as a computer program product. Detection system 818 includes a census data generation system 820 for periodically generating census data for at least one object in a heap and a collection system 822 for collecting the periodically generated census data for each object type into a time series. Detection system 818 also includes an analyzing system 824 for analyzing the time series provided by the collection system 822, a classification system 826 for classifying each time series into one of a plurality of categories based on the analysis provided by analyzing system 824, and an isolating system 828 for isolating the cause of detected anti-patterns.

It should be appreciated that the teachings of the present invention can be offered as a business method on a subscription or fee basis. For example, computer system 800 could be created, maintained, supported, and/or deployed by a service provider that offers the functions described herein for customers. That is, a service provider could be used to provide detection of memory management anti-patterns, as describe above.

It should also be understood that the present invention can be realized in hardware, software, a propagated signal, etc. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

I claim:

1. A computer-implemented method for detecting memory management anti-patterns, comprising:
    periodically generating, using a processor, census data for at least one object type in a heap;
    collecting the periodically generated census data for each object type into a time series;
    analyzing, using the processor, each time series;

classifying, using the processor, each time series into one of a plurality of different categories based on the analysis;

determining a memory-related metric, wherein the memory-related metric comprises the size of the heap;

comparing the memory-related metric to a threshold value; and performing the generating, collecting, analyzing, and classifying only upon the memory-related metric being above the threshold value.

2. The method of claim 1, wherein the census data is generated by:

performing garbage collection;

providing a heap dump; and generating census data for the at least one object type in the heap.

3. The method of claim 1, wherein each of the plurality of different categories corresponds to a different type of memory management issue.

4. The method of claim 3, wherein at least one of the plurality of different categories is indicative of a memory leak of a particular type.

5. The method of claim 3, further comprising:

isolating a cause of the memory management issue.

6. The method of claim 1, wherein the category is selected from the group consisting of a constant time series, a capped time series, an increasing maximum time series, and a bounded time series.

7. A computer implemented computer hardware system for detecting memory management anti-patterns, comprising:

a processor, wherein the processor is configured to perform:

periodically generating census data for at least one object type in a heap;

collecting the periodically generated census data for each object type into a time series;

analyzing each time series;

classifying each time series into one of a plurality of different categories based on the analysis;

determining a memory-related metric, wherein the memory-related metric comprises the size of the heap; and comparing the memory-related metric to a threshold value; wherein the processor generates the census data only if the memory-related metric being above the threshold value.

8. The system of claim 7, wherein the processor is further configured to perform:

performing garbage collection; and providing a heap dump.

9. The system of claim 7, wherein each of the plurality of different categories corresponds to a different type of memory management issue.

10. The system of claim 9, wherein at least one of the plurality of different categories is indicative of a memory leak of a particular type.

11. The system of claim 9, wherein the processor is further configured to perform isolating a cause of the memory management issue.

12. The system of claim 7, wherein the category is selected from the group consisting of a constant time series, a capped time series, an increasing maximum time series, and a bounded time series.

13. A computer program product comprising a computer usable storage medium having stored therein computer usable program code for detecting memory management anti-patterns, the computer usable program code, which when executed by a computer hardware system, causes the computer hardware system to perform:

periodically generating census data for at least one object type in a heap;

collecting the periodically generated census data for each object type into a time series;

analyzing each time series;

classifying each time series into one of a plurality of different categories based on the analysis;

determining a memory-related metric;

comparing the memory-related metric to a threshold value; and performing the generating, collecting, analyzing, and classifying only upon the memory-related metric being above the threshold value.

14. The computer program product of claim 13, wherein the computer usable program code further causes the computer hardware system to perform:

performing garbage collection;

providing a heap dump; and generating census data for the at least one object type in the heap.

15. The computer program product of claim 13, wherein each of the plurality of different categories corresponds to a different type of memory management issue.

16. The computer program product of claim 15, wherein at least one of the plurality of different categories is indicative of a memory leak of a particular type.

17. The computer program product of claim 15, wherein the computer usable program code further causes the computer hardware system to perform:

isolating a cause of the memory management issue.

18. The computer program product of claim 13, wherein the category is selected from the group consisting of a constant time series, a capped time series, an increasing maximum time series, and a bounded time series.

19. A method for deploying an application for detecting memory management anti-patterns, comprising:

providing a computer hardware system comprising a processor being operable to:

periodically generate census data for at least one object type in a heap;

collect the periodically generated census data for each object type into a time series;

analyze each time series;

classify each time series into one of a plurality of different categories based on the analysis;

determine a memory-related metric, wherein the memory-related metric comprises the size of the heap;

compare the memory-related metric to a threshold value; and perform the generating, collecting, analyzing, and classifying only upon the memory-related metric being above the threshold value.

* * * * *